E. McDOWELL.
RESILIENT TIRE CUSHION.
APPLICATION FILED JUNE 4, 1918.

1,327,717.

Patented Jan. 13, 1920.

WITNESSES

INVENTOR
Edward McDowell
BY
ATTORNEYS

UNITED STATES PATENT OFFICE.

EDWARD McDOWELL, OF ATLANTA, GEORGIA.

RESILIENT TIRE-CUSHION.

1,327,717.  Specification of Letters Patent.  Patented Jan. 13, 1920.

Application filed June 4, 1918. Serial No. 238,171.

*To all whom it may concern:*

Be it known that I, EDWARD McDOWELL, a citizen of the United States, and a resident of Atlanta, in the county of Fulton and State of Georgia, have made certain new and useful Improvements in Resilient Tire-Cushions, of which the following is a specification.

My present invention relates generally to automobile and similar tires, and more particularly to a resilient cushion for use therein in lieu of the usual inner tube, and corresponding to air pressure, my object being the provision of a cushion, the structure of which will permit of the utilization of waste rubber, especially used inner tubes.

In carrying out my invention, I preferably employ used automobile and other inner tubes, utilizing the same as an economical and satisfactory source of thin rubber. I cut such rubber into narrow strips, plait the same together into four-stranded plaits, and I then twist a number of these plaits together, forming a rope-like cushion of three or more of these twists or members, to be placed within an outer casing or tire shoe in lieu of the usual inner tube and to provide the necessary pressure or resistance.

In the accompanying drawing illustrating my present invention:

Figure 1:
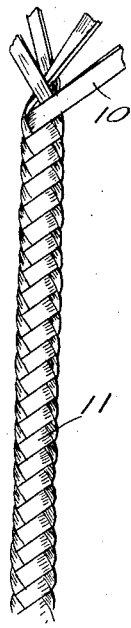
Figure 1 is an elevation of one of the four-stranded plaits, formed of four strips of rubber.
Figure 2:
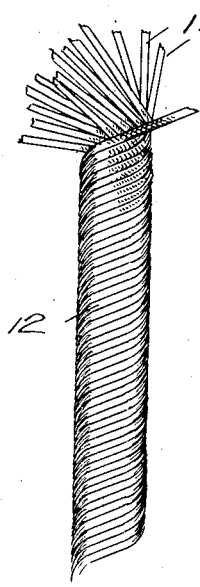
Fig. 2 is a similar view of one of the twists of a plurality of the plaits shown in Fig. 1.

Referring now to these figures, my invention proposes the cutting of thin rubber, preferably old used tire inner tubes, into relatively narrow strips 10, four of which are used in the formation of each four-stranded plait, 11, one of which is shown in detail in Fig. 1, and a number of which are shown twisted together in Fig. 2, to form a rounded twist 12.

Any suitable number of plaits 11 may be utilized, depending to some extent upon the size or diameter of the cushion being required.

Figure 3:
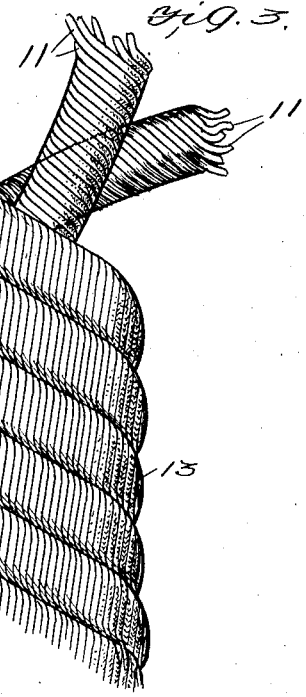
Fig. 3 is another similar view of a rope or cushion formed of a series of the twists of Fig. 2.
Figure 4:
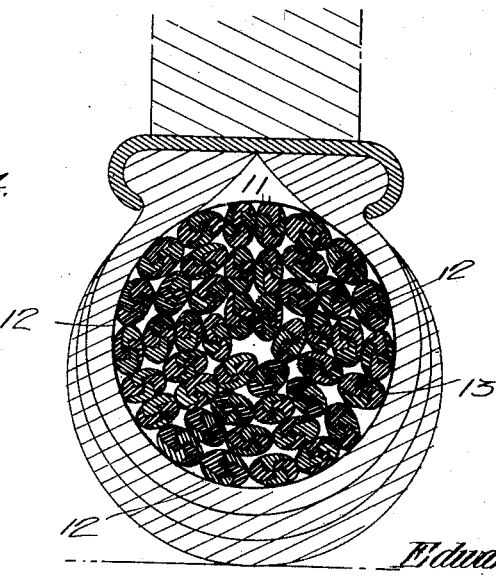
Fig. 4 is a radial section through a complete tire embodying my invention.

Fig. 3 shows a further step of the invention, which consists in twisting several, preferably three, of the members 12 into what I call the rope-like cushion 13, thus forming the complete and sufficiently round cushion for installation within the tire or casing.

In this way, I am enabled to utilize what is ordinarily a waste product, namely the used and discarded inner tubes, which under present conditions are disposed of as junk, and my invention not only provides for this but also provides for an effective and resilient inner cushion, wherein the manner of forming the same enables full benefit to be derived from the material employed.

I claim:

An inner cushion for tire casings, consisting of a rope-like core interfitting the casing and comprising a plurality of twisted strands, each strand including a plurality of twisted plaits, and each plait consisting of a number of plaited flat strips of waste rubber.

EDWARD McDOWELL.

Witnesses:
  HENDERSON HALLMAN,
  JAS. M. STOCKER.